United States Patent [19]

Tymianski

[11] Patent Number: 5,427,297

[45] Date of Patent: Jun. 27, 1995

[54] FEEDING SYSTEM FOR MULTIPLE RIVETING MACHINE

[76] Inventor: Marek Tymianski, 29 Lailey Crescent, Willowdale, Ontario, Canada, M2H 4H2

[21] Appl. No.: 149,368

[22] Filed: Nov. 9, 1993

[51] Int. Cl.$^6$ ............................................. B21J 15/34
[52] U.S. Cl. ................................. 227/109; 227/114; 227/135
[58] Field of Search ............... 227/109, 114, 115, 116, 227/135, 119, 51

[56] References Cited

U.S. PATENT DOCUMENTS

| | | | |
|---|---|---|---|
| 3,273,776 | 9/1966 | Bryson | 227/109 |
| 3,543,985 | 12/1970 | Adolphi | 227/114 |
| 3,934,777 | 1/1976 | Kramer et al. | 227/109 |
| 4,694,984 | 9/1987 | Altwicker | 227/109 |

Primary Examiner—Scott A. Smith
Attorney, Agent, or Firm—Cushman Darby & Cushman

[57] ABSTRACT

A rivet feeding assembly for feeding a plurality of rivets defining a set, in unison to a multiple-riveting machine having a press operably co-operable with a plurality of strikers and complementary rivet-receiving anvils in a machine riveting zone to effect multiple riveting by pressing, the assembly comprising:
  a track means comprising a plurality of rivet-retaining guides for retaining the rivets in a rivet heads-up orientation as a plurality of horizontal rows of rivets wherein each row defines a set of rivets;
  a selector means co-operable with the track for receiving a single set of rivets and located away from the machine riveting zone as to not interfere with the pressing; and
  a transfer member co-operable with the selector for receiving and transferring the single set of rivets to the machine riveting zone. The apparatus provides reliable rivet feeding to the rivet tools, improved conventional set-up and change-over time and cost of tooling and the ability to deliver the rivets to the rivetting zone in any desired pattern by a single feeding system.

9 Claims, 6 Drawing Sheets

FEEDING SYSTEM FOR MULTIPLE RIVETING MACHINE

FIELD OF INVENTION

This invention relates to a rivet feeding system for a multiple riveting machine for riveting materials together, such as those used in the manufacture of automobile disc brakes.

BACKGROUND OF THE INVENTION

In known multiple-riveting machines a plurality of rivets are fed from a hopper, generally a rotary drum, through tracks to flexible jaws that restrain individual rivets on anvils complementary under striker. The rivets are fed, individually, simultaneously in unison, to the plurality of jaws below the strikers which are laid out in line arrangement of rivets designed for a particular riveted product manufactured by the riveting machine. The members to be riveted together are disposed on the anvils, one member on top of the other member having their rivet receiving holes in vertical alignment. Each rivet is hit by its respective striker and pushed through the aligned holes against the anvil where the rivet is deformed to effect intimate retention of the parts. In one multiple-riveting machine, built to rivet a brake lining to a metal backing, the rivetting pattern is usually set in two rows. In order to reach both rows the rivet feeding system comprises a pair of hoppers and a plurality of vertically aligned, outwardly curved rivet guides. The pair of tracks are oppositely, disposed, one on either side of the strikers, rivet holding jaws and respective anvils comprising the press system. The two hoppers continuously fill each guide with rivets which are retained within the guides so oriented that the head of the rivet is retained within the guide. The body of the rivet projects initially outwardly from the body of press and, subsequently, downwardly and vertically with the head above its body as it is received by the jaws. Each track has a selector member suitably located as to allow passage only of a desired single set of rivets to pass at each stroke of the press to the jaws. Typically, each track system has four to six guides.

In the above feeding assembly of use with a riveting machine, the plurality of rivets from the track fall from the sides and between the jaws out of the guides to directly below the strikers of the press. Only one row of jaws, close to the track per rigid feeding system of the multiple-riveting machine can be filled. Space must be left available above the jaws to permit the plurality of strikers to descend on the rivets and this space must be free of fixed tracking. Thus, one feeding system is able generally to rivet only one row per cycle. In cases where two rows of rivets are desired, a second rivet tracking system on the other side of the machine, as hereinabove described, is used. This duplicate tracking system does not provide for greater ranges and varieties of rivet layout patterns. The fixed to the side track system, hereinabove described, is curved and is prone to distortion, particularly on installation. Such distortion may cause uneven and delayed rivet delivery in operation. Accordingly, installation of such a system requires skilled personnel for the initial setup and subsequent changeovers.

Further, since the head of the sliding rivet is in the track's guide slot, there are friction forces under the head and at the top of the rivet. These forces will be at their maximum when the rivet has to pass the maximum curvature of the track, when the rivet is oriented or positioned horizontally. The longer the rivet the greater the frictional forces present, since the centre of gravity of the rivet moves away from the track and creates a greater moment. As a result, these frictional forces limit the length of the rivet that may be used in order for the rivet to quickly and efficaciously slide down along the track without interference.

Yet further, as there is a gap between the track and the receiving jaws, the rivet, which is leaving the track with a certain speed, sometimes bounces back or falls to the wrong position.

Since the rivets are fed into the jaws from the sides, the jaws must be specially shaped. This results in an additional capital expense.

SUMMARY OF THE INVENTION

It is an object of the present invention to provide a rivet feeding system for use with a multiple riveting machine which provides reliable feeding of the rivets into the riveting tools.

It is a further object of this invention to provide such a feeding system which is able to deliver the rivets to the rivetting zone in any desired pattern.

It is a yet further object of the present invention to provide such a rivet feeding system which decreases the conventional setup and changeover time and cost of tooling.

It is yet further object of the present invention to provide such a rivet feeding system which does not interfere with the pressing operations and components.

Accordingly, in its broadest aspect the invention provides a rivet feeding assembly for feeding a plurality of rivets defining a set, in unison to a multiple riveting machine having a press operably co-operable with a plurality of strikers and complementary rivet-receiving anvils in a machine riveting zone to effect multiple riveting by pressing, said assembly comprising:
  track means comprising a plurality of rivet-retaining guides for retaining said rivets in a rivet heads-up orientation as a plurality of horizontal rows of rivets, wherein each row defines a set of rivets;
  selector means co-operable with said track means for receiving a single set of rivets and located away from said machine riveting zone as to not interfere with said pressing; and
  transfer means co-operable with said selector means for receiving and transferring said single set of rivets to said machine riveting zone.

Preferably, the selector means comprises a member having a plurality of rivet receiving slots and which is moveable to a first position of being able to receive a single set of rivets, preferably as a horizontal row thereof, which is in unison the position where the slots are in alignment to receive from the track guides. Displacement of the moveable member from this first position causes the member to block the guides of the track and prevent more than the addition of a single row of rivets. Movement of the member to a second position enables the retained rivets of the member to be received by a corresponding plurality of conduits to effect transfer of the set directly through the conduits More preferably, a suitably shaped transfer block is disposed between the conduits and the moveable member to facilitate transfer from the inclined, heads-up rivet orientation to a substantially, vertical position in the conduits.

Thus, in a preferred embodiment, the assembly is as hereinabove defined wherein said selector means comprises a first moveable member having a plurality of first rivet receiving means and moveable from a first position to a second position relative to said track means and adapted to receive said single set of rivets in said first position, one rivet per first rivet receiving means; and a plurality of conduits co-operable with said first moveable member in said second position to receive said single set of rivets from said first moveable member.

More preferably, the assembly as hereinabove defined further comprises said transfer means being co-operable with said plurality of conduits and comprises
- a holding member having a plurality of first rivet receiving apertures and co-operable with said plurality of conduits to receive said single set of rivets as to provide one rivet per aperture;
- a second moveable member having a plurality of rivet holes being moveable from a second moveable member first position to a second moveable member second position wherein said rivet holes are disposed in vertical alignment with said rivet receiving apertures when said second moveable member is in said second moveable member first position so as to receive said single set of rivets;
- a transfer member having a plurality of second rivet-receiving apertures and being moveable from a transfer member first position to said machine riveting zone and being co-operable with said second moveable member as to receive said single set of rivets from said second moveable member when said second moveable member is in said second moveable member first position and said transfer member is in said transfer member first position; and
- means co-operable with said transfer member to effect transfer of said transfer member from said transfer member first position to said machine riveting zone and back.

To enable the conduits to be readily utilized in the assembly of the invention, the conduits are formed of a flexible material.

One preferred method of loading the track means with the rivets in a heads-up oriented manner comprises use of a hopper having a plurality of rivet-retaining guides which receive the rivets in a heads-up orientation when the hopper is moved, typically shaken to cause movement of the rivets to fall within the guides of the hopper, and effecting movement of the hopper from a somewhat horizontal loading position to an inclined rivet releasing position to effect transfer of the rivets from the hopper guides to the track guides.

Thus, the invention provides apparatus for feeding rivets to a multi riveting press where the rivets remain in either a vertical or inclined position in a heads-up orientation such that each of the rivets are supported only at the bottom of its head which, advantageously, minimizes frictional forces and permits satisfactory use of longer length rivets.

Thus, the rivets are fed vertically from another part of the assembly, outside the press, through the conduits to the transfer member, which method of feeding eliminates any restriction in the type and form of a desired pattern of riveting of use in a desired product.

The transfer means preferably comprises a holding member having a plurality of first rivet receiving apertures and co-operable with said plurality of conduits to receive said single set of rivets as to provide one rivet per aperture;

The holding member may take the form of a template in communication with the flexible conduits which template has a corresponding of apertures to receive the rivets, which cannot leave the template due to blockage of the apertures with a moveable member unless the member allows this. Preferably, the member comprises a slider having a plurality of holes each of which may be disposed in vertical alignment directly below the corresponding hole of the template to permit passage of the single set of rivets, in unison, there through, only when the slider is in this required position. The slider is in this desired position only when a moveable tray having rivet receiving holes to receive the single set of rivets in a desired pattern is disposed below in vertical alignment with the channels of the slider. The rivet laden tray is transferred, preferably by means of a piston to provide the rivets to the machine rivetting zone. The riveting zone has the members to be rivetted together preset and disposed below the tray when the tray is located in the rivetting zone, and between the plurality of strikers and anvils.

The operations may be co-ordinated by control systems comprising sensors built into the selector and slider. The sensors are utilized to ensure that no rivet of a single set, wherein the row of rivets in a particular pattern is missing. In the case or a missing rivet, the press action is signalled to cease.

The tray is preferably provided with a plurality of flexible collets formed of, for example, moulded urethane, which reside, individually, in the apertures of the tray such that each collet retains an individual rivet from the loading step, while allowing of displacement of the rivet by the striker through to the holes of the members to be rivetted together.

In a most preferred embodiment of the invention, the selection of each individual row of rivets by the selector and transfer therefrom, in unison, through the block and respective conduits and slider to the tray, can be advantageously synchronized as hereinafter described with reference to the preferred embodiment.

These and other objects and features of the present invention will become more apparent from an understanding of the following detailed description of a preferred embodiment of the invention when considered in conjunction with the accompanied drawings.

DETAILED DESCRIPTION OF THE PREFERRED EMBODIMENT

Figure 1:
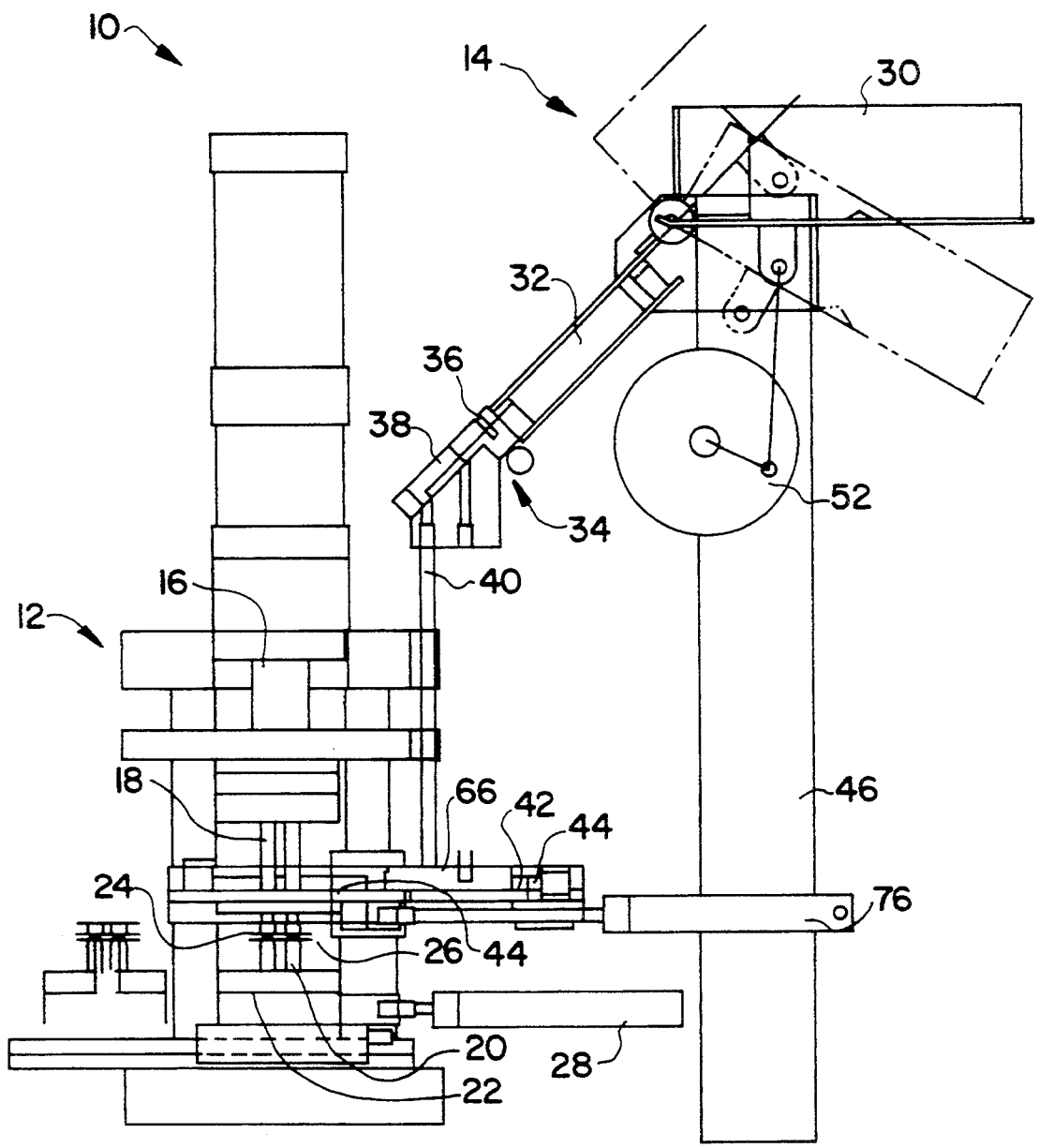
FIG. 1 represents a diagrammatic side view of a rivet feeding assembly of the invention in association with a multiple-riveting machine.

FIG. 1 shows generally as 10, a multi-rivetting machine of the invention having a press assembly shown generally as 12, and a feeding assembly shown generally as 14 according to the invention.

Figure 4:
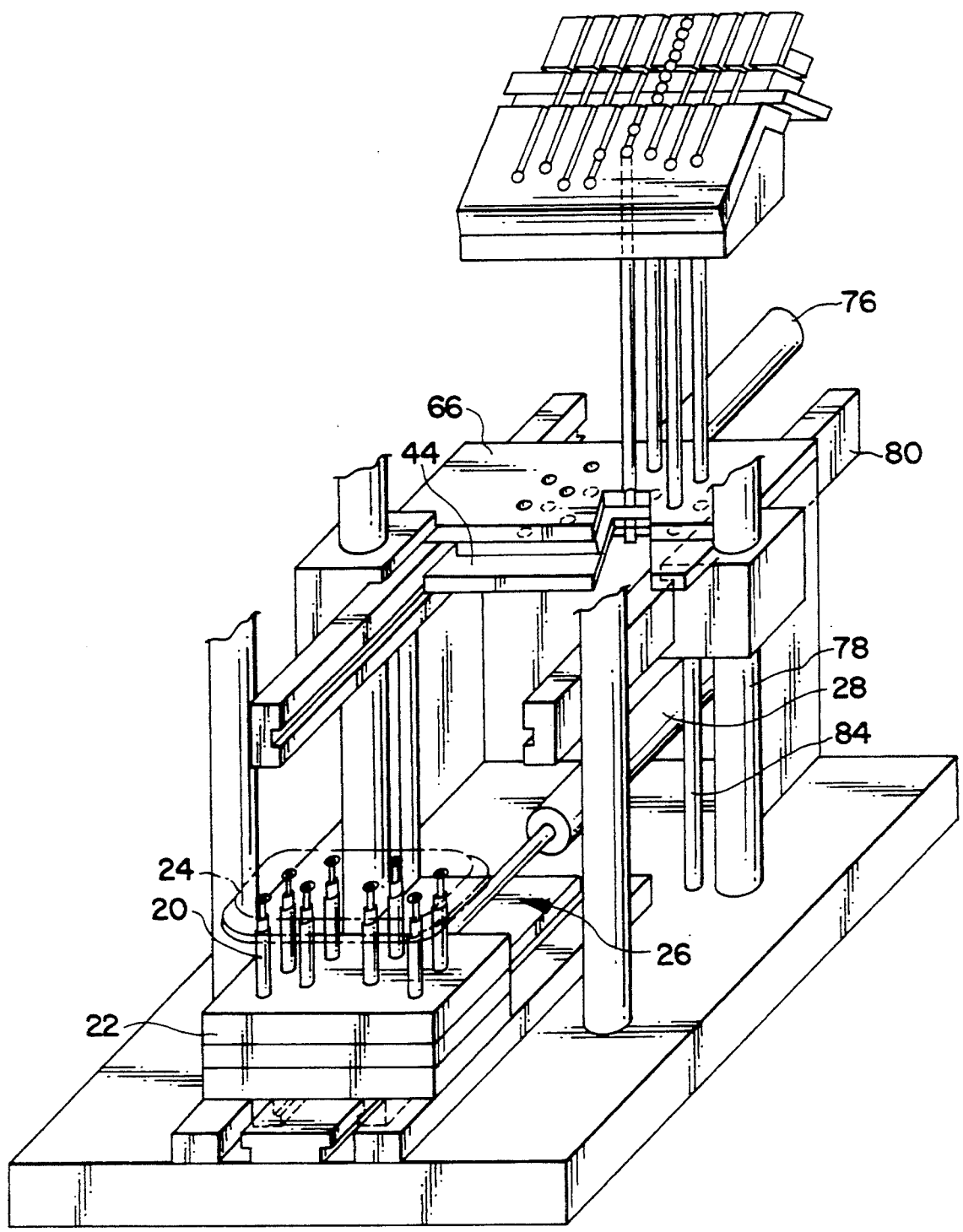
FIG. 4 represents a diagrammatic perspective view, in part, of a lower part of an assembly of the present invention in association with the machine riveting zone of a multi-riveting machine.

Press assembly 12 comprises a press 16, a plurality of strikers 18 vertically disposed and in corresponding alignment with a plurality of complementary anvils 20. Anvils 20 are retained on a housing base 22, operably loaded with the members to be riveted together, for example, a brake pad and associated backing plate assembly 24 (shown in ghost lines). Base 22 is moved under and out of a machine rivetting zone, shown generally as 26, by a pneumatic piston 28, as is better shown in FIGS. 4 and 7.

Feeding assembly 14 comprises a hopper 30, a track 32, a selector system shown generally as 34 and comprising a selector member movable by piston 86, movable selector member 36 and block 38. Block 38 co-operates with conduits 40 to a template 66 and a tray 44 which is moved from a loading position under template 66 to the working zone 26 by a cylinder 76. The assembly is substantially supported by stand 46 adjacent to but remote from machine rivetting zone 26.

Figure 2:
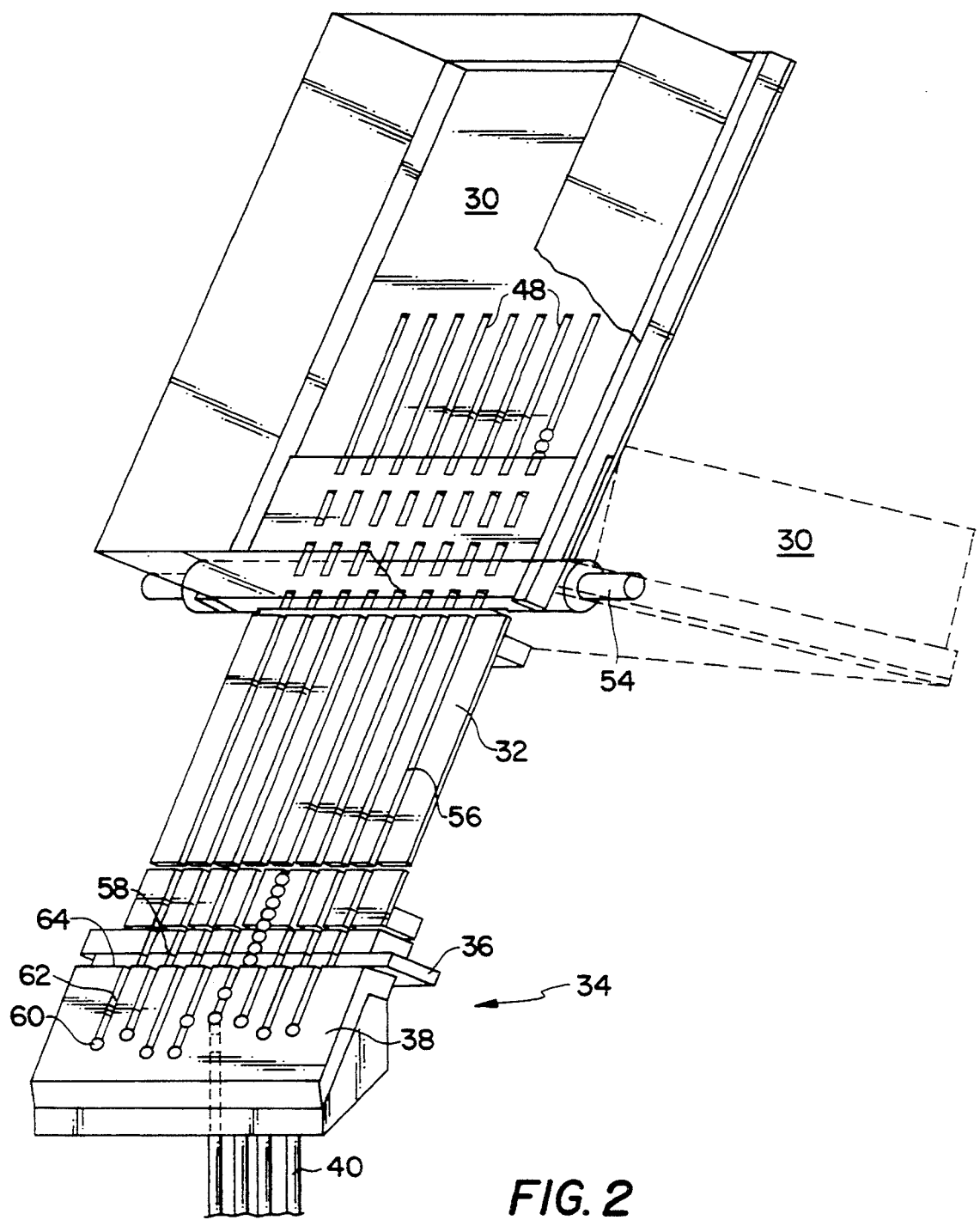
FIG. 2 represents a diagrammatic perspective view of an upper part of an assembly according to the invention.
Figure 3A:
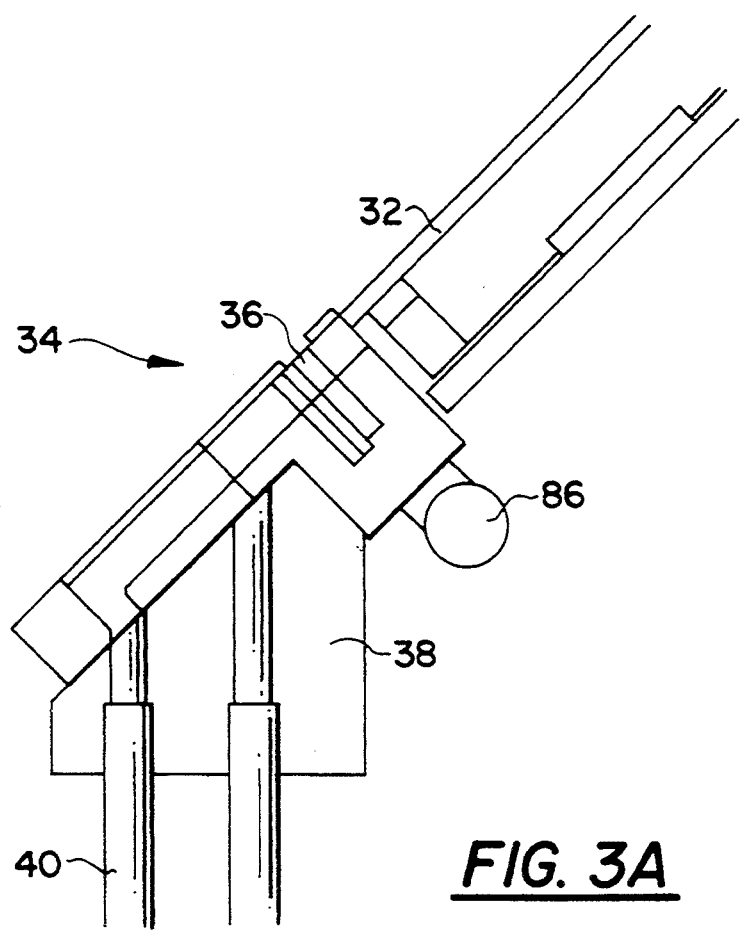
FIG. 3A represents a diagrammatic side view, in part, of a rivet selector means co-operable with track means of use in the assembly of the invention.
Figure 3B:
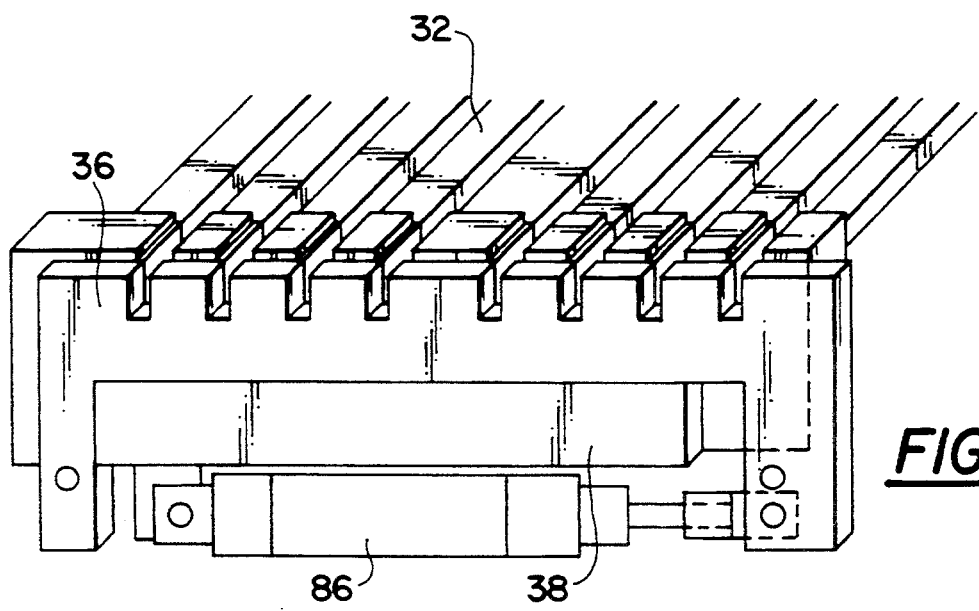
FIG. 3B represents a diagrammatic perspective view of a rivet selector of an assembly according to the invention.

In greater detail, with reference to FIG. 2, this shows rectangularly-shaped hopper 30 in an up alignment and an essentially horizontal down arrangement. Hopper 30 has a plurality of longitudinal parallel hopper guides 48, eight in the embodiment shown, which are of sufficient width to allow entry of the body of a rivet, but not the head thereof. Movement of hopper 30 causes rivets to fall into guides 48 to either fully or partially fill guides 48 in a head-up orientation. Raising of hopper 30 by oscillating means 52 (FIG. 1) causes hopper 30 to be raised around axle 54.

Co-operable with hopper 30 is track 32 having a plurality of track guides 56, which are in direct alignment with hopper guides 48 when hopper 30 is in its raised position, so as to allow rivets in hopper guides 48 to free-fall to track guides 56 in their head-up orientation.

At the lower end of track 32 is moveable selector member 36, which blocks track guides 56 to prevent entry of rivets into member 36, unless the latter are suitably aligned in a first position relative to track guides 56. Selector 36, thus, is of sufficient height as to permit entry of only a single rivet, in a head-up orientation, to constitute a single row of rivets, defining a set of rivets, for subsequent transfer. Track 32, thus, provides a means of storing a plurality of rows of rivets for single dispensation, one row at a time, out of track guides 56.

Co-operable with member 36 is block 38 having a plurality of block apertures 60 in communication with a plurality of conduit apertures 40, one aperture 60 per conduit 40. Block apertures 60 are so disposed within block 38 as to permit suitable disposition therein. Apertures 60 are provided with a plurality of upper channels 62, which extend to an upper edge 64 of block 38. The disposition and shape of channels 62 in block 38 are such as to permit transfer of a row of rivets retained by selector 36 when the latter moves from a filling position to a second position wherein selector apertures 58 of selector member 36 and channels 62 are in corresponding alignment.

Figure 5:
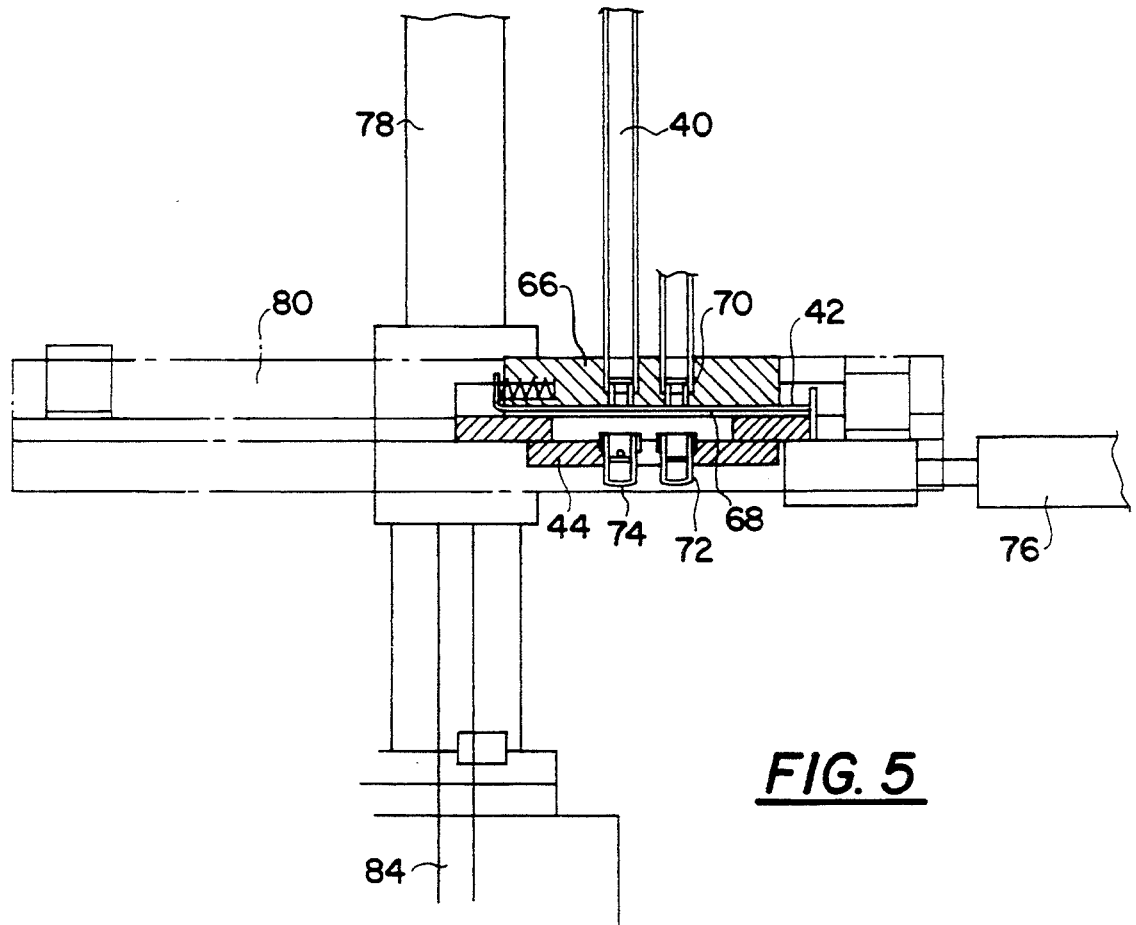
FIG. 5 represents a diagrammatic side view of a transfer means of use in the invention in cooperation with a multi-riveting machine.
Figure 6:
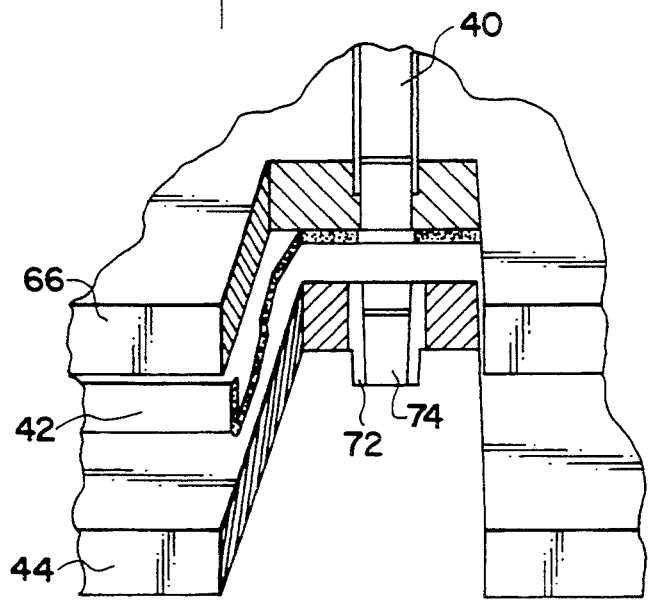
FIG. 6 represents a partly cut-away diagrammatic view through a template, tray, collet and slider of a multiple riveting machine according to the invention.
Figure 7:
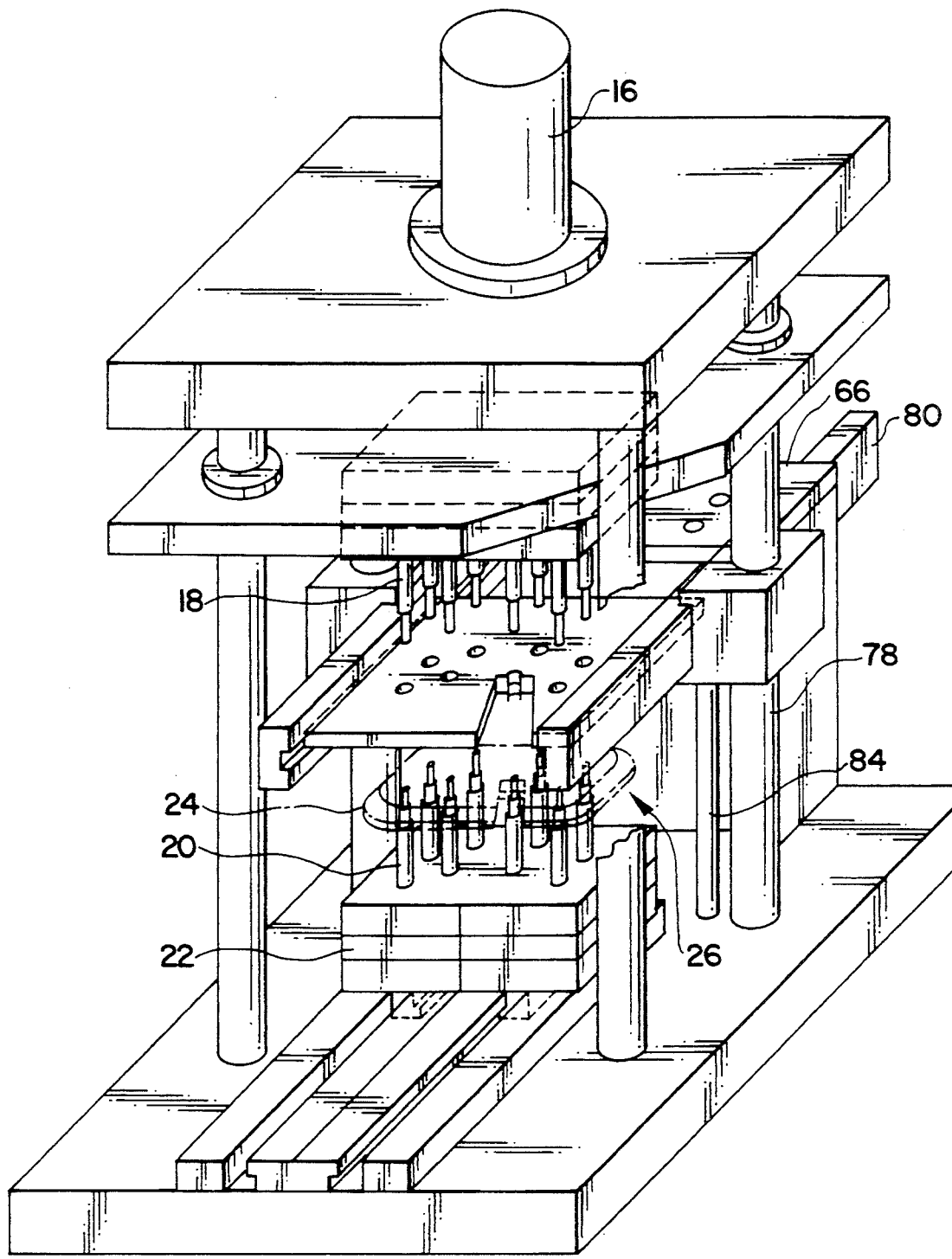
FIG. 7 represents a perspective view, in part, of an assembly according to the invention with a slider approximate the rivetting zone.

With particular reference to FIG. 5, conduits 40 terminate in template 66, the lower surface 68 of which abuts slider 42. Slider 42 has a plurality of circular apertures of greater width than the rivet heads used in the assembly. Slider apertures 70 in a first position are so aligned with conduits 40 as to permit unrestricted passage through apertures 70. In alternative positions of slider 42, relative to stand 46, slider 42 seals off the ends of conduits 40 as to prevent passage of rivets out thereof. Co-operating with slider 42 is tray 44 which has a plurality of rivet-receiving apertures 72 and rivets-retaining collets 74 residing therein. Slider 42 is spring-loaded and is displaceable by tray 44 to enable apertures 70 of slider 42 to be vertically aligned below template holes 70 and collets 74 to create a free passage for rivets to fall from template 66 to collets 74 for retention therein. Tray 44 is moveable under pneumatic piston 76 to move tray 44 from its loading position to its working position in the machine riveting zone 26 (FIG. 7). When tray 44 is in its working position, slider 42 blocks the aperture of template 70.

With tray 44 in its working position, the rivets retained therein are spaced exactly according to the desired riveting pattern. Movement of press 16 causes strikers 18 to hit the plurality of rivets out of collets 74 to engage corresponding complementary anvils 20, while rivets are in the apertures of the members to be riveted together in the machine riveting zone 26 to effect multiple riveting of the members. Tray 44 in addition to being moveable horizontally by piston 76 is moveable, vertically, on guides 78. Such vertical movement is required in order to bring the rivets in tray 44 in abutment with the members to be rivetted together.

As the press effects the rivetting step, selector 36 is moved to bring selector apertures 58 into alignment with channels 62 in block 38 to permit entry of a single row of rivets in unison into channel 62 and via conduits 40, under gravity, to template 66. Since tray 44 is in its working position, passage of the rivets out of template 66 is prevented. Thus, one set of rivets is in a stand-by position in member 66. Upon retraction of press 16, tray 44 is raised and moved to the tray rivet loading position while pushing slider 42 away from blocking apertures of template 66. This causes a set of rivets to fall in to collates 74. At this stage, selector 36 returns back to its rivet loading position wherein a single row of rivets are received in selector apertures 58. Also, as the press effects the rivetting step, horizontal tray guides 80 bearing tray 44 containing rivets 74, are moved down by a piston (not shown) on tie-rods 84 to rivetting—zone 26.

The above operations are co-ordinated by a controller system having sensors (not shown) built into selector 36 and slider 42. Sensors are used to sense that no rivet is missing. In the case of a missing rivet, press 16 gets a signal to stop.

It can be seen that because the rivets in the track slots are oriented head-up and supported only at the base of the head, frictional forces are reduced to a minimum. This enables the feeding system to accept much longer rivets. Since feeding the rivets vertically from the top of the feeding assembly and outside of the machine riveting zone there is no restriction in the type and form of a desired riveting pattern.

Rigid track guides 56 of flat and rigid, vertically aligned track 32, provides stability to the feeding system.

To set up the press for a different rivet pattern arrangement, only an exchange of template, tray and tools is required, with the conduits being inserted in to the holes of the new template. This operation can be easily done by an unskilled set-up man in the minimum amount of set-up time. Further, since the template and tray are simple in design and flexible collates can be made from moulded plastics, the cost of such tooling is significantly lower than prior tooling.

It can be seen that the rivets are guided all the way until they fall into the collets, which assures of their proper orientation at all times. Since there is always one set of rivets on standby, which set is adjacent the tray when the latter is in its loading position, there is no bouncing of rivets to effect change of orientation of the rivets.

Although this disclosure has described an illustrated a preferred embodiment of the invention, it is to be understood that the invention is not restricted to this particular embodiment. Rather, the invention includes all embodiments which are functional or mechanically equivalent of the specific embodiment and features that have been described, illustrated and claimed.

I claim:

1. A rivet feeding assembly for feeding a plurality of rivets defining a set, in unison to a multiple-riveting machine having a press operably co-operable with a plurality of strikers and complementary rivet-receiving anvils in a machine riveting zone to effect multiple riveting by pressing, said assembly comprising:

track means comprising a plurality of rivet-retaining guides for retaining said rivets in a rivet heads-up orientation as a plurality of horizontal rows of rivets wherein each row defines a set of rivets;

selector means co-operable with said track means for receiving a single said set of rivets and located away from said machine riveting zone as to not interfere with said pressing; and transfer means co-operable with said selector means for receiving and transferring said single set of rivets to said machine riveting zone.

2. An assembly as claimed in claim 1 wherein said selector means comprises a first moveable member having a plurality of first rivet receiving means and moveable from a first position to a second position relative to said track means and adapted to receive said single set of rivets in said first position, and a plurality of conduits co-operable with said first moveable member in said second position to receive said single set of rivets from said first moveable member.

3. An assembly as claimed in claim 2 wherein said selector means further comprises a transfer block co-operable with said first moveable member and said plurality of conduits and located there between to effect transfer of said single set of rivets from said first moveable member to said plurality of conduits.

4. An assembly as claimed in claim 2 wherein said transfer means is co-operable with said plurality of conduits and comprises:

a holding member having a plurality of first rivet receiving apertures and co-operable with said plurality of conduits to receive said single set of rivets as to provide one rivet per aperture;

a second moveable member having a plurality of rivet holes being moveable from a second moveable member first position to a second moveable member second position wherein said rivet holes are disposed in vertical alignment with said rivet receiving apertures when said second moveable member is in said second moveable member first position so as to receive said single set of rivets;

a transfer member having a plurality of second rivet-receiving apertures and being moveable from a transfer member first position to said machine riveting zone and being co-operable with said second moveable member as to receive said single set of rivets from said second moveable member when said second moveable member is in said second moveable member first position and said transfer member is in said transfer member first position; and means co-operable with said transfer member to effect transfer of said transfer member from said transfer member first position to said machine riveting zone and back.

5. An assembly as claimed in claim 2 wherein said conduits are formed of a flexible material.

6. An assembly as claimed in claim 1 further comprising a hopper having a second plurality of rivet-retaining guides adapted to receive said rivets in a heads-up orientation, said hopper being movable from a first hopper position to a second hopper position.

7. An assembly as claimed in claim 6 wherein said second plurality of rivet-retaining guides are in alignment with said track means so as to effect transfer of said rivets from said hopper to said track means when said hopper is in said second hopper position; and means for moving said hopper from said first hopper position to said second hopper position as to effect transfer of said rivets to said track means.

8. An assembly as claimed in claim 7 wherein said hopper moving means comprises means for oscillating said hopper.

9. A rivet feeding assembly as claimed in claim 1, further comprising, in combination a press, a plurality of strikers and a complementary plurality of rivet-receiving anvils in a machine riveting zone adapted to receive a set of rivets from said rivet feeding assembly.

* * * * *